Aug. 21, 1962     A. M. LEITZEL     3,050,115
PULP MOLDING SUCTION DIE STRUCTURE AND METHOD OF MAKING
Filed Aug. 10, 1959     3 Sheets-Sheet 1

INVENTOR.
Ammon M. Leitzel
BY
Buckhorn, Cheatham, & Blore

ATTORNEYS

Aug. 21, 1962 A. M. LEITZEL 3,050,115
PULP MOLDING SUCTION DIE STRUCTURE AND METHOD OF MAKING
Filed Aug. 10, 1959 3 Sheets-Sheet 2

INVENTOR.
Ammon M. Leitzel
BY
Buckhorn, Cheatham, & Blore
ATTORNEYS

Aug. 21, 1962   A. M. LEITZEL   3,050,115
PULP MOLDING SUCTION DIE STRUCTURE AND METHOD OF MAKING
Filed Aug. 10, 1959   3 Sheets-Sheet 3

INVENTOR.
Ammon M. Leitzel
BY
Buckhorn, Cheatham, & Blore
ATTORNEYS

United States Patent Office 3,050,115
Patented Aug. 21, 1962

3,050,115
PULP MOLDING SUCTION DIE STRUCTURE
AND METHOD OF MAKING
Ammon M. Leitzel, Portland, Oreg., assignor to Pacific Pulp Molding Co., Portland, Oreg., a corporation of Washington
Filed Aug. 10, 1959, Ser. No. 832,790
9 Claims. (Cl. 162—411)

This invention relates to a pulp molding suction dies structure and method of making and more particularly to an improved screen structure for such die and method of making in which the wires of one or more woven wire screens are secured together by fillets of metal to provide a stiffened and smoothed screen structure.

Pulp molding suction dies in common use include perforated backing plates having surface contours approximately that of the desired surfaces on molded pulp articles. Such perforated backing plates have been covered by one or more layers of woven metal wire screen or wire cloth. The screens forming the outer surfaces of the dies have the surface contours of the desired molded articles and such screens have been conventionally clamped to the backing plates at their edges. Such screens have been of malleable or ductile metal, such as brass or bronze, and have been formed to the desired surface contours by pressing them against the surfaces of the backing plates or against forming members having similar surface contours. The suction dies have internal chambers communicating with the perforations through the backing plates.

In the employment of suction dies of the type briefly described above, the dies are dipped into a pulp slurry and a vacuum is produced in the chambers in the dies so as to remove water from the pulp slurry and build up layers of pulp upon the screens in contact with the slurry. The dies with layers of pulp thereon have then been removed from the slurry and the layers of pulp at least partly dried on the dies either with or without pressing operations with mating dies or flexible blankets. The formed and partially dried layers of pulp are then removed from the suction dies, for example, by transferring them to mating dies. This operation usually includes the introduction of air under pressure into the chambers in the dies in order to force from the screens the layers of pulp which have been formed into desired molded pulp articles upon the suction dies.

During the formation of the layers of pulp upon the screens of suction dies and in any subsequent operation, such as pressing or ironing of the layers of pulp upon suction dies, the fibers of the pulp tend to penetrate into the recesses or crevices formed between the wires of the screens where such wires are in contact with each other or approach closely to each other. The layers of pulp thus interlock with such screens, particularly with the screens which are in direct contact with the layers of pulp, so that considerable force is required to remove such layers of pulp from the screens. The screens in direct contact with the layers of pulp tend to be forced away from the other screens or from the backing plates, if single screens are employed on the dies, and since such screens have considerable flexibility, there is usually a partial pulling away of such screens from the underlying supports therefor so that such screens rapidly wear and also the accuracy of the dies is lost as a result of bulging or other deformation of the screens on the surfaces of the dies. Various attempts have been made to fasten the screens at a plurality of points, for example, by driving headed fasteners through the screens into apertures in the dies or even in some cases, by spot welding the screens to the dies or spot welding screens together at intermediate points in order to stiffen them. Such expedients have only been partially successful and it has thus been necessary to frequently re-screen the suction dies. This is not only expensive and time consuming but requires frequent shut downs of the pulp molding apparatus to change dies.

In accordance with the present invention, the screen or screens employed on a suction die are stiffened by having their wires secured together by metal bonds at the points of closest approach of such wires. In the preferred construction, the plurality of such screens are employed with a coarser screen adjacent the perforated backing plate and a finer screen at the surface upon which the pulp layer is collected. When such plurality of screens are employed, all of the screens have their crossing wires bonded together and also the various screens are secured together at a plurality of points by bonding the wires of such screens together where they approach most closely to each other. In any case, the screen upon which the pulp layer is formed has its crossing wires secured together by bonds of metal which fill the crevices between the wires to form small fillets preventing entrance of pulp fibers into the crevices between the wires. Such fillets of metal round the corners of the meshes of the screen but the amount of metal entering into the bonds is not sufficient to destroy or seriously impair the porous nature of the screen structure.

The wires of the various screens can be secured together by first electro plating each screen with a fusible metal, i.e., a metal having a lower melting point than the metal of the wires, and then heating the screen to a temperature above the melting point of the fusible metal but below the melting point of the metal of the wire. Such a plating operation plates the individual wires of the screen but does not secure the wires together. A relatively heavy plating of the fusible metal is employed so far as metal plating standards are concerned and such amount is sufficient to form the small fillets described above where the wires approach each other. When the screens are heated above the melting point of the fusible metal, the metal migrates along the wires into the crevices where the wires touch or closely approach each other so as to form such fillets.

The screens are preferably formed into the desired configuration to fit the surface of the die prior to electro plating. Where a plurality of screens are employed, the preferred operation is to first form each screen into desired configuration, then electro plate each screen and then superimpose the screens and press them together. Such pressing is preferably accomplished upon a forming plate having the surface contour of the backing plate to which the screens are to be applied. The fusible metal is preferably one which is ductile, such as tin or a soft tin alloy, so that the pressing of the several screens together tends to deform such metal and interlock the wires of various screens.

The metal fusing operation is preferably performed by positioning the formed and pressed together screens upon a heated metal supporting plate having the contour of the backing plate so that the screens are retained in their desired shape during the fusing operation and so that heat is rapidly imparted to the plated screens. As soon as the metal has been fused, the screen can be removed from such supporting plate and allowed to cool. It will be found that the coated metal has largely migrated to the crevices between the wires of each screen and between the wires of the several screens. The result is a structure which is many times more rigid than is the case where a plurality of screens are superimposed without having their wires fused to each other. In general, it is unnecessary to fasten the resulting laminated screen structure to the backing plate except at edges of such structure. Furthermore, the crevices into which pulp fibers penetrate in previously employed screens have been filled or filleted with fusible metal so that the parting force between the molded pulp article and the screen is very much less. It has been found that the laminated and bonded screen structure of the present invention last many times longer than previous screen structures for suction dies. Furthermore, the surface of the molded article which was in contact with such screen is smoother and more pleasing in appearance.

While the present invention is particularly adaptable to forming of laminated screen structures for pulp molding suction dies, it is apparent that laminated screen structures for other purposes may be produced by the method discussed above, or even the wires of a single screen may be bonded together to form a more rigid and smoother screen.

It is therefore an object of the invention to provide an improved screen structure in which wires of such screen are bonded together at their areas of closest approach by bonds of metal forming fillets in the crevices which would otherwise be present.

Another object of the invention is to provide an improved method of making a screen structure in which the crossing wires of such screen are bonded together and the crevices between such wires filled with a metal which has a melting point lower than the metal of the wires of such screens.

A further object of the invention is to provide a method of making a laminated screen structure in which the wires of such screens are bonded together by metal plated upon such wires and fused to form the bonds referred to in the form of small fillets filling the crevices between the wires of the individual screens and of the various screens.

A further object of the invention is to provide an improved laminated woven wire screen structure made up of a plurality of layers of screen in which the wires of the several screens are held together by metal bonds extending between the wires of the individual screens and between the wires of superimposed screens.

Other advantages and objects of the invention will appear in the following detailed description of a preferred embodiment of the process made in connection with the attached drawing and of the preferred embodiment of the resulting structure, also shown in the attached drawing of which:

Figure 1:
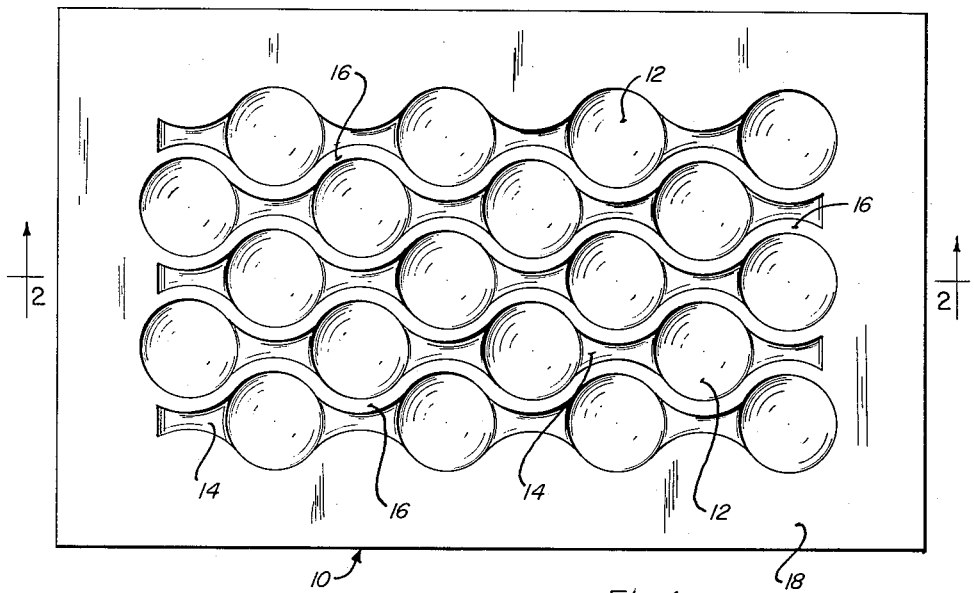
FIG. 1 is a plan view of a screen forming element having surface configuration useful in shaping one form of screens for a pulp molding suction die.
Figure 2:
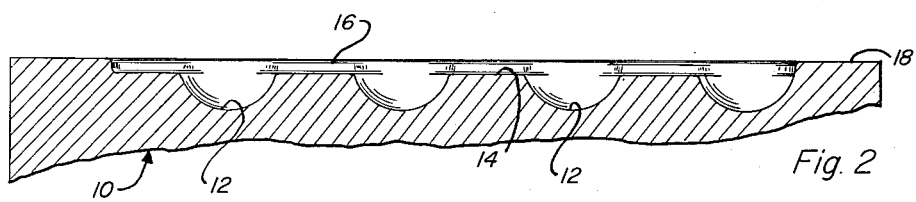
FIG. 2 is a partial vertical section of the member of FIG. 1 taken on the line 2—2 of FIG. 1.

Referring more particularly to the drawings, a screen forming or shaping member 10 is shown in FIGS. 1 and 2. Such shaping member 10 may have a surface configuration including a plurality of depressions 12 which are rounded in form and have their lower extremities all in a common plane, such depressions being depressed below a plurality of flattened areas 14 positioned in an intermediate plane and surrounded by upwardly projecting sinuous ridge portions 16 terminating in a third plane, which in the structure shown, is also the plane of the edge portions 18 of the screen shaping member. Such surface configuration is suitable for shaping screens for use on suction dies for forming molded pulp fruit packing trays and is merely one example of a surface configuration capable of being employed in the present invention.

Figure 3:
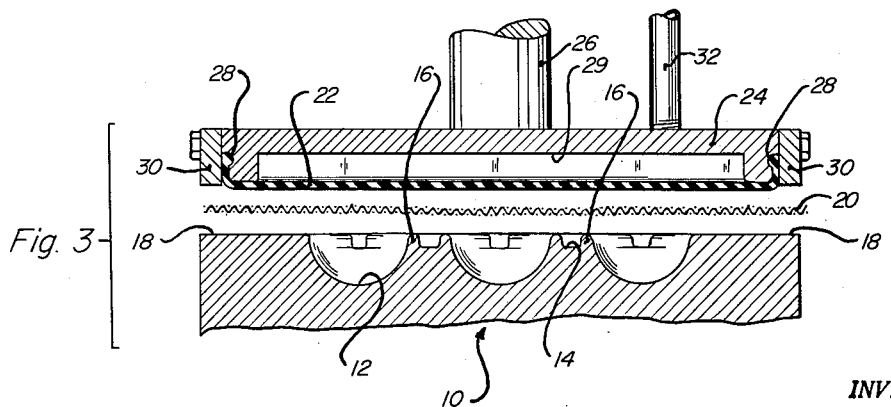
FIG. 3 is a fragmentary vertical section through an apparatus employed for shaping a screen for a pulp molding suction die and showing the screen forming member in section at right angles to the section of FIG. 2.

The shaping member 10 is placed in a screen shaping device shown in FIG. 3, and a piece of woven wire screen 20 of suitable size is placed over the contoured surface of such screen shaping member. The screen is forced into contact with such contoured surface by means of a flexible blanket 22, such as a rubber blanket, carried by a pressure member 24 of approximately the same area as the screen shaping member 10. The pressure member 24 is carried on the end of a plunger 26 so as to be reciprocable vertically in FIG. 3 by any suitable source of power, such as a hydraulic cylinder (not shown). The blanket 22 may be held in position on the pressure member by means of thickened rims 28 received in a suitable groove in the backing member 24 and by clamping members 30 holding the thickened rim 28 in the groove. The pressure member has a pressure chamber 29 formed therein above the blanket 22. Upon lowering of the backing member 24 by the plunger 26, the edges of the screen 20 are clamped between the edge portions 18 of the screen shaping member 10 and the edges of the blanket 22.

Figure 4:
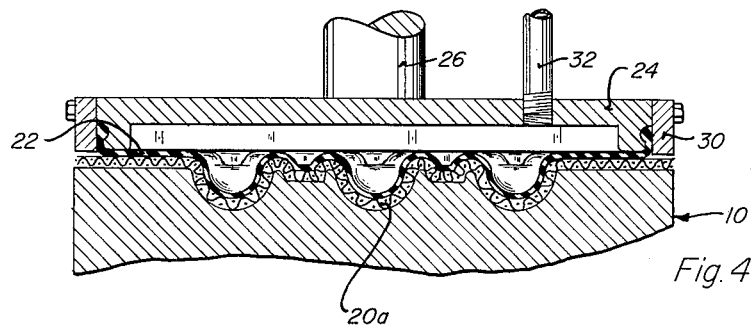
FIG. 4 is a view similar to FIG. 3, showing the apparatus in a different position.

After the edges of the woven wire screen 20 have thus been clamped, fluid under pressure is introduced into the pressure chamber 29 through the pipe 32. In actual practice, for a deep drawing operation such as illustrated in the drawings, it is usually necessary to first partly shape the screen by restricting the pressure in the pressure chamber 29 to one which will not tear the screen and to then remove the screen from the shaping device and anneal the screen. The screen is then again placed in the shaping device and shaping pressure again applied. Several annealing and pressing operations may be necessary to completely shape the screen. The result of the shaping operation is illustrated in FIG. 4 in which the blanket 22 has forced the screen 20 into contact with the contoured surface of the member 10. The screen is thus shaped by stretching and deformation of the wires of the screen and for this reason the screen is preferably made of wires of a ductile, deformable wire, preferably brass or a suitable bronze. After each partial or final shaping operation, the fluid pressure within the pressure member 24 is released so that the blanket 22 is retracted from contact with the surfaces in the depressions of the screen shaping member 10 and then the pressure member 24 is elevated so that the formed screen 20a can be removed from the shaping member 10.

Figure 5:
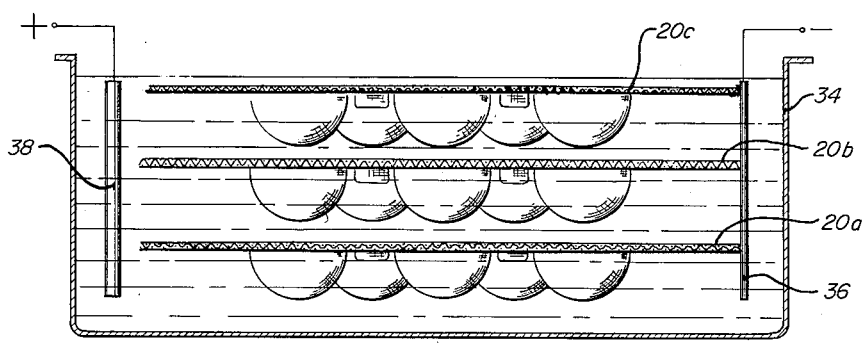
FIG. 5 is a diagrammatic view showing an electro plating tank for plating the screens formed in the apparatus of FIGS. 3 and 4.

A plurality of screens are thus shaped on the screen shaping member 10 and in a preferred structure, there are two relatively coarse screens and a relatively finer screen shaped for each pulp molding suction die. Such screens are then subjected to a suitable cleaning operation and then electro plated with a metal which has a lower melting point than the metal of the wire of the screens. Thus in FIG. 5, two shaped coarse screens 20a and 20b as well as shaped fine screen 20c are shown as being positioned in a plating tank 34 and connected to a conductor 36 so as to act as cathodes. An anode 38 is also positioned in such tank and the screens and electrodes 36 and 38 are immersed in a suitable plating solution so that a fusible metal is plated upon the wires of the screens. The plating operation of FIG. 5 is intended to be diagrammatic only as any suitable plating operation known to the art can be employed. Although the screens are shown in a generally horizontal position in FIG. 5, ordinarily they will be positioned in generally vertical planes to assist in the liberation of any gas formed during the plating operation. The metal plated upon the screens may be any platable metal which has a melting point substantially lower than that of the metal of the screens and which is considerably above atmospheric temperature and which will not melt the metal of the wires when fused. Preferably, the metal is also a ductile metal. Tin has been found to be a suitable metal but other fusible metals including alloys capable of being plated from a plating solution can be employed. An operation in which the screens are dipped into or otherwise brought into contact with a body of molten metal cannot be employed for the screens contemplated by the present invention, since such molten metal will fill the meshes of such screen and too much metal will be left on the screen.

Figure 6:
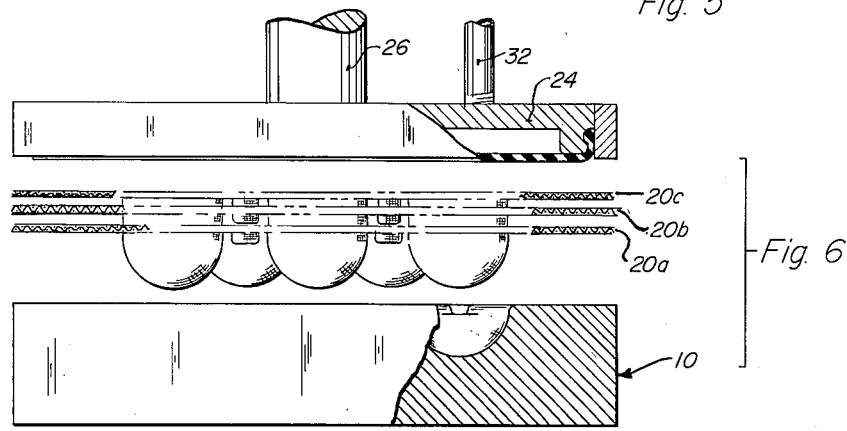
FIG. 6 is a view similar to FIG. 3, showing a plurality of plated screens in position to be pressed together.
Figure 7:
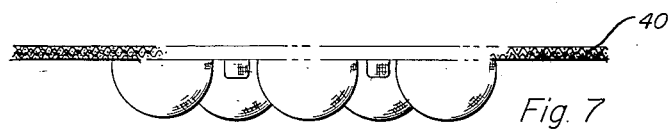
FIG. 7 is a diagrammatic representation of a plurality of screens after they have been pressed together.

The plated screens are removed from the plating tank and are washed and coated with a suitable flux. They are then superimposed as illustrated diagrammatically in FIG. 6 and the superimposed screens are then positioned in the same apparatus as the apparatus of FIGS. 3 and 4, or a similar apparatus. The same or similar shaping member 10 may be employed. Again the pressure member 24 is lowered by the plunger 26 and fluid under pressure introduced into the pressure chamber 29 through the pipe 32 to compress the various screens together and form them into a laminate 40 shown in FIG. 7. The lowermost screen, which is the coarser screen 20a of FIG. 6, has the contour of the contoured surface of the screen shaping member 10 and the other screens are shaped to conform to the other side of the screen 20a, etc. Such forming further bends or distorts the screens 20b and 20c and results in considerable interlocking between the wires of the various screens, in part resulting from deformation of the ductile or malleable metal with which the screens are coated. The outer surface of the fine screen 20c has the desired form of one side of the article to be formed.

Figure 8:
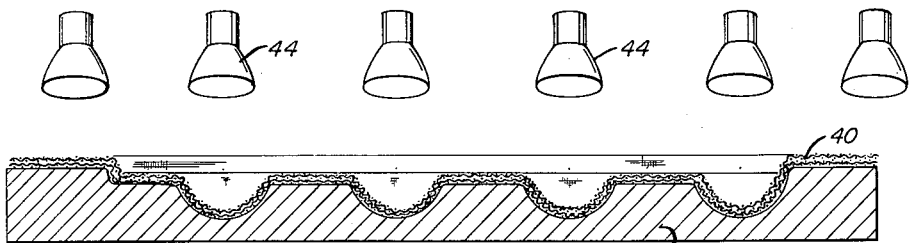
FIG. 8 is a view showing diagrammatically a heating apparatus for fusing screens of the present invention together, said apparatus being shown in vertical section.

The laminate 40 is of sufficient mechanical strength to be handled without separation of the screens and upon releasing the fluid pressure within the pressure chamber and elevating such pressure member 24 by the plunger 26, the laminate 40 can be removed from the shaping apparatus. Such laminate 40 can then be placed upon the surface of a heated metal plate 42, also having the surface contour of the shaping member 10 so that the surface of the laminate which was in contact with the shaping member 10 fits the contoured surface of the heated plate 42. Such plate 42 may be heated in any desired manner and one manner of heating, when tin is the fusible metal, is to employ a plurality of infra red lamps, such as the lamps 44, shown diagrammatically in FIG. 8 as being positioned above the plate 42 with the laminate 40 in position thereon. The fusible metal plated upon the wires of the various screens forming the laminate 40 is fused and it is found that such metal tends to migrate along the wires into the crevices between such wires where the wires come in contact with each other or approach each other closely. The plate 42 may be of aluminum or other metal which develops an oxide film to which the fused metal will not adhere. The heated laminate 40 is then removed from the plate 42 and allowed to cool.

Figure 10:
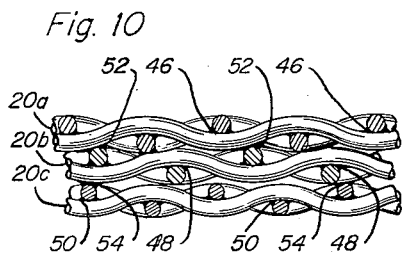
FIG. 10 is a fragmentary vertical cross section of the structure of FIG. 9.
Figure 9:
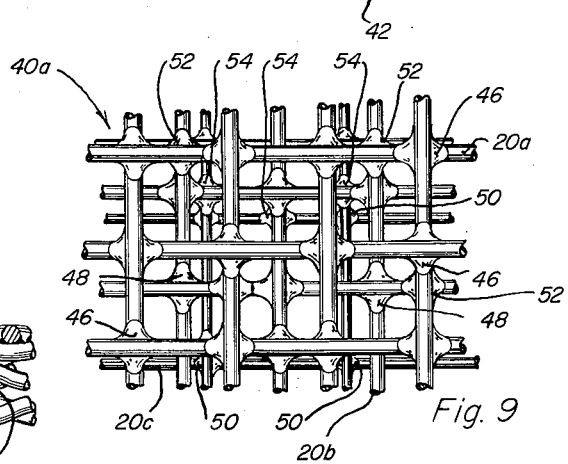
FIG. 9 is a fragmentary bottom view showing on a greatly enlarged scale a portion of the fused screen structure made in the apparatus of FIGS. 1 and 8, the coarser screens being shown on top for clarity of illustration.

An attempt has been made to show the resulting structure on a greatly enlarged scale in FIGS. 9 and 10. The laminate 40a is shown with the coarse screen 20a on top, coarse screen 20b next and the fine screen 20c on the bottom and visible through the other two screens. This is the reverse of the relative positions of the screens shown in any of the other figures of the drawing but results in a clearer illustration. The collection of fused metal in the crevices where the wires cross each other or approach each other is also shown in FIG. 9, wherein the wires of the screen 20a are joined by fillets 46 of metal, the wires of the screen 20b are joined by fillets 48 and the wires of the screen 20c are joined together by fillets 50. Where certain wires of the screens 20a and 22b come in contact with each other or approach each other, the screens are secured together by similar fillets 52, and the wires of the screens 20b and 20c are joined together by fillets 54. The result is a foraminous structure in which the various openings between the wires of the screens have rounded corners and the crevices between the various wires wherever they cross or otherwise come close together are filled with the fused and solidified metal having a lower melting point than the metal of the wires of the screen. The structure just described with respect to FIG. 9 is shown in fragmentary cross section in FIG. 10.

Figure 11:
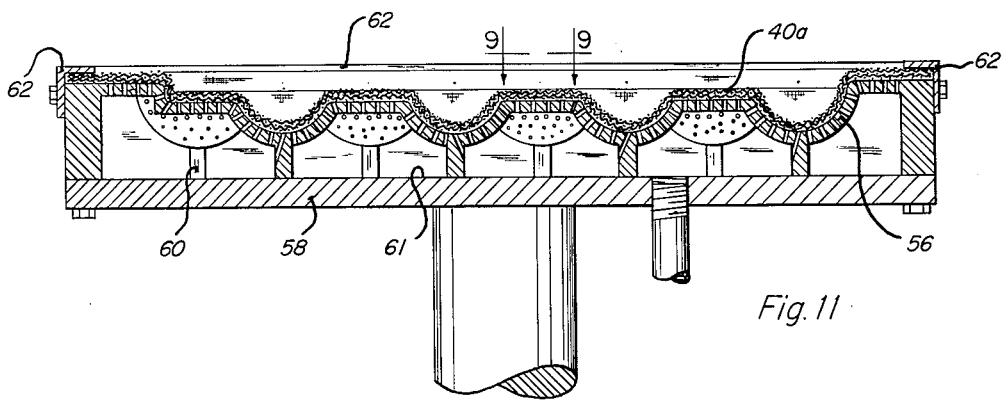
FIG. 11 is a somewhat diagrammatic view showing a pulp molding suction die in cross section.

The resulting laminated structure 40a is shown in FIG. 11 as having been placed in position upon a perforated backing plate 56 forming part of a complete pulp molding suction die. Such perforated backing plate is secured to a die supporting plate 58 and has a hollowed out back portion provided with support posts 60 bearing upon the die supporting plate 58 to provide a chamber 61 behind the backing plate, which can be employed as a vacuum chamber during forming of a layer of pulp on the surface of the suction die and as a pressure chamber when the at least partly dried layer of pulp is removed from the suction die. The laminated screen structure 40a is shown as being secured at its edges to the perforated backing plate 56 by means of the clamping rim 62. Even though the laminated screen structure 48 still has most of its original porosity in that the apertures between the wires of the screen are nearly as large as they were before the wires are fused together, it is an extremely rigid structure. Also the fine crevices into which fiber of the pulp would normally extend so as to interlock the layer of pulp with the screen have been filled with a fused and solidified metal. This results in a structure in which the molded pulp layer much more easily parts from the screen. Such greater parting efficiency and increased strength of the laminated screen structure in most cases eliminates the necessity of any intermediate attachment of the screen structure to the surface of the perforated backing plate 56, although if desired suitable attaching means can be employed at such intermediate positions and also if desired the screens of the structure may be additionally secured together by spot soldering at spaced points of the structure. Also the screen structures of the present invention need replacement at much less frequent intervals than with prior structures.

While a laminate made up of two coarse screens and one fine screen has been specifically disclosed, it is apparent that any suitable number of screens of the same or different mash can be employed and that the method of the present invention will produce a much stronger single screen than conventional woven screens if a single screen is plated with or without shaping and then heated so as to have its wires bonded together by fusible metal.

While shaping of the various screens into a desired configuration prior to plating with a fusible metal is the preferred operation, for limited shaping operations not requiring intermediate annealing steps, it is possible to reverse the order of the plating and shaping steps. It is also possible to make a stiffened flat screen and also a flat screen laminated structure from a plurality of flat screens without employing any screen shaping.

As discussed above, the preferred fusible metal for the wires of the screen is of a type which has considerable ductility or malleability but other metals can be employed for the wires of the screen where it is not desired to even partly shape the screens after plating. As also discussed above, the preferred metal for the fusible metal plated on the wires of the screen is tin, but other fusible metals, for example, silver could be employed or screens having wires made of metal with a substantially higher melting point than silver. The thickness of the metal plated upon the wires of the screen will vary with the size of such wires and the mesh of the screen but, in general, will be somewhat thicker than that usually considered necessary to provide a protective coating upon metals. The coating should be of sufficient thickness to supply enough metal to securely bond together the various wires of a single screen or of a plurality of superimposed screens and produce small fillets of metal filling the cracks or crevices where the wires cross or come into contact or close to each other.

The method of the present invention is particularly applicable to relatively fine mesh screens which would have their meshes filled with metal by attempting to apply molten metal thereto. Thus a suitable laminated structure for a suction die may, for example, include two backing screens having 30 meshes to the inch and an outer screen having 50 meshes to the inch. That is to say, the present method is particularly applicable to screens ranging from approximately 20 to 200 meshes per inch.

I claim:

1. The method of securing a plurality of woven metal wire screens together to form a laminated screen structure for a pulp molding suction die in which the wires of each of said screens and of adjacent screens are secured together at their points of closest approach by metal bonds, which method comprises, electro plating the wires of said screens with a fusible metal having a lower melting point than the metal of said wires, superimposing said screens and pressing said screens together to form a laminate, heating said laminate to fuse said second metal only and cooling the resulting structure to produce a laminated structure in which the wires of said screens are bonded together by said fusible metal.

2. A method of securing a plurality of woven metal wire screens together to form a laminated screen structure for a pulp molding suction die in which the screens are adapted to conform to a backing plate of said die and the wires of each of said screens and of adjacent screens are secured together at their points of closest approach by metal bonds, which method comprises, similarly shaping said screens by displacing portions of said screens out of the plane of said screens to provide similarly contoured screens, electro plating the wires of said screens with a fusible metal having a lower melting point than the metal of said wires, superimposing said screens and pressing said screens together to form a laminate with said portions interfitting, heating said laminate to fuse said fusible metal and cooling the resulting structure to produce a laminated structure.

3. The method of making a screen structure for a pulp molding suction die having a desired surface contour, which method includes the steps of forming a plurality of woven metal wire screens to fit the surface contour of said die, plating said screens with a fusible metal having a melting point lower than the melting point of the metal of said wire, pressing the plated screens together to form a laminated screen structure and heating said laminated screen structure above the melting point of said fusible metal and below the melting point of the metal of said wire to fuse said fusible metal, and cooling the resulting structure to produce a laminated screen structure in which the wires of each of said screens and of adjacent screens are secured together by bonds of said fusible metal.

4. The method of making a screen structure for a pulp molding suction die having a desired surface contour, which method includes the steps of forming a plurality of woven metal wire screens to fit the surface contour of said die by pressing said screens individually against a member having said contour, plating said screens with a fusible metal having a melting point lower than the melting point of the metal of said wire, superimposing the plated screen on a member having said contour and pressing said plated screens together to form a laminated screen structure, and heating said laminated screen structure above the melting point of said fusible metal and below the melting point of the metal of said wire to fuse said fusible metal, and cooling the resulting structure to produce a laminated screen structure in which the wires of each of said screens and of adjacent screens are secured together by bonds of said fusible metal.

5. The method of making a pulp molding suction die, which method comprises, forming a perforated metal backing plate having a desired surface contour, pressing a plurality of woven metal screen against a shaping member having said contour to form said screens into the shape of said contour, individually electro plating said screens with a ductile metal having a melting point lower than the melting point of the metal of said wire, thereafter superimposing said screens and pressing said screens together on a member having said surface contour to form a laminate, heating said laminate while positioned on a heating member having said surface contour to fuse said ductile metal, removing the heated laminate from said heating member and cooling the resulting structure to provide a laminated screen structure in which the wires of each of the screens and of adjacent screens are secured together at areas of closest approach between said wires by bonding fillets of said ductile metal, and securing said laminated screens structure upon the surface of said backing plate.

6. A laminated woven metal wire screen structure for a pulp molding suction die comprising a plurality of superimposed woven contoured wire screens having interfitting portions including areas of compound curvature displaced out of the planes of said screens and having the wires of each of said screens and of adjacent screens secured together at their areas of closest approach to each other by bonds of a metal having a melting point lower than the metal of said wire.

7. A pulp molding suction die comprising a perforated backing plate having areas of compound curvature, a woven metal wire screen structure positioned upon said backing plate, said structure including a screen fitting said backing plate and having the wires of said screen secured together at their areas of closest approach to each other by bonds of a metal having a melting point lower than the melting point of said metal of said wires.

8. A pulp molding suction die comprising a perforated backing plate, a laminated woven metal wire screen structure positioned upon said backing plate, said structure including a plurality of superimposed screens having the wires of each of said screens and of adjacent screens secured together at their areas of closest approach to each other by bonds of a metal having a melting point lower than the melting point of said metal of said wires.

9. A pulp molding suction die comprising a perforated backing plate, a laminated woven metal wire screen structure positioned upon said backing plate, said backing plate having a desired surface contour and said screen structure having a form fitting said surface contour, said screen structure including a plurality of superimposed woven wire screens having the wires of each of said screens and of adjacent screens secured together at their areas of closest approach to each other by bonds of a metal having a melting point lower than the metal of the metal of said wires and providing fillets at said areas of closest approach.

References Cited in the file of this patent

UNITED STATES PATENTS

| | | |
|---|---|---|
| 827,365 | Harris | July 31, 1906 |
| 1,321,410 | Ackers | Nov. 11, 1919 |
| 1,555,296 | Kirschner | Sept. 29, 1925 |
| 1,934,643 | Rafton | Nov. 7, 1933 |
| 2,510,999 | Oldofredi | June 13, 1950 |
| 2,601,815 | De Reamer | July 1, 1952 |
| 2,851,931 | Leitzel | Sept. 16, 1958 |
| 2,893,664 | Gerhauser | July 7, 1959 |